(12) United States Patent
Glickman et al.

(10) Patent No.: US 11,987,209 B2
(45) Date of Patent: May 21, 2024

(54) DEPLOYABLE STEP SYSTEMS FOR ACCESSING CARGO SPACES ON VEHICLES EQUIPPED WITH A TAILGATE ASSEMBLY THAT INCLUDES A DOOR SUBASSEMBLY

(71) Applicant: FORD GLOBAL TECHNOLOGIES, LLC, Dearborn, MI (US)

(72) Inventors: David Brian Glickman, Southfield, MI (US); Stuart C. Salter, White Lake, MI (US); Dennis Yee, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 17/222,013

(22) Filed: Apr. 5, 2021

(65) Prior Publication Data

US 2022/0314888 A1  Oct. 6, 2022

(51) Int. Cl.
| | | |
|---|---|---|
| B60R 3/02 | (2006.01) | |
| B60D 1/01 | (2006.01) | |
| B62D 33/027 | (2006.01) | |

(52) U.S. Cl.
CPC ............ B60R 3/02 (2013.01); B60D 1/01 (2013.01); B62D 33/0273 (2013.01)

(58) Field of Classification Search
CPC ....... B60R 3/007; B60R 3/02; B62D 33/0273; B62D 33/03; B60D 1/01
See application file for complete search history.

(56) References Cited

U.S. PATENT DOCUMENTS

| | | | | |
|---|---|---|---|---|
| 5,678,872 A * | 10/1997 | Slater | ...................... | B60R 19/48 293/118 |
| 6,145,865 A * | 11/2000 | Cannara | ................... | B60D 1/60 280/491.1 |
| 6,170,843 B1 * | 1/2001 | Maxwell | .................. | B60R 9/06 280/166 |
| 6,237,927 B1 * | 5/2001 | Debo | ........................ | B60R 3/02 280/166 |
| 6,511,086 B2 * | 1/2003 | Schlicht | .................... | B60R 3/02 280/166 |
| 6,530,588 B1 * | 3/2003 | Varney | ...................... | B60R 3/02 280/505 |
| 6,685,204 B1 * | 2/2004 | Hehr | ......................... | B60R 3/02 280/166 |
| 6,874,806 B1 * | 4/2005 | Blake | ..................... | B60D 1/605 280/507 |
| 7,195,262 B2 * | 3/2007 | Chaudoin | ............... | B60R 3/007 280/169 |
| 7,377,563 B1 * | 5/2008 | Demick | .................. | B60R 19/48 280/166 |
| 7,434,825 B2 * | 10/2008 | Williams | ................. | B60R 3/02 280/166 |

(Continued)

Primary Examiner — Jeffrey J Restifo
(74) Attorney, Agent, or Firm — Vichit Chea; Carlson, Gaskey & Olds, P.C.

(57) ABSTRACT

Deployable step systems for accessing vehicle cargo spaces on vehicles equipped with a tailgate assembly having a door subassembly may include a bumper integrated step pad that is movable between a stowed position and a deployed position. In the stowed position, the step pad establishes a portion of the bumper, and in the deployed position, the step pad is rearward and vertically lowered relative to the bumper.

17 Claims, 5 Drawing Sheets

(56) References Cited

U.S. PATENT DOCUMENTS

| | | | | |
|---|---|---|---|---|
| 7,503,572 B2* | 3/2009 | Park | | B60R 3/02 280/165 |
| 7,703,784 B2* | 4/2010 | Plavetich | | B60R 3/02 280/166 |
| 8,366,129 B2* | 2/2013 | Salmon | | B60R 3/02 280/166 |
| 8,602,467 B2* | 12/2013 | Lee | | B60R 11/06 293/106 |
| 8,827,294 B1* | 9/2014 | Leitner | | B60R 3/02 280/166 |
| 9,315,145 B2* | 4/2016 | Salter | | B60Q 1/307 |
| 9,434,317 B2* | 9/2016 | Nania | | B60R 3/02 |
| 9,440,579 B2* | 9/2016 | Salter | | B60Q 1/2661 |
| 9,533,621 B1* | 1/2017 | Rees | | B60R 3/002 |
| 9,963,076 B1* | 5/2018 | Bender | | B60R 3/02 |
| 10,562,456 B2* | 2/2020 | Lynch | | B60R 3/02 |
| 10,611,309 B1* | 4/2020 | Nagase | | B60R 3/02 |
| 11,370,361 B1* | 6/2022 | Rosario Gonzales | | B60D 1/42 |
| 2005/0006870 A1* | 1/2005 | Williams | | B60R 3/02 280/166 |
| 2006/0170180 A1* | 8/2006 | Collins | | B60R 9/06 280/166 |
| 2008/0106106 A1* | 5/2008 | Lavoie | | B60R 3/02 293/117 |
| 2009/0008896 A1* | 1/2009 | Phillips | | B60R 3/007 280/166 |
| 2012/0018975 A1* | 1/2012 | Salmon | | B60R 3/02 280/166 |
| 2013/0015637 A1* | 1/2013 | Siebrandt | | B60R 3/007 280/495 |
| 2013/0154229 A1* | 6/2013 | Kim | | B60R 3/02 280/163 |
| 2015/0084304 A1* | 3/2015 | Mendoza | | B60R 3/02 280/163 |
| 2016/0137134 A1* | 5/2016 | Nania | | B60R 3/02 280/164.1 |
| 2017/0008459 A1* | 1/2017 | Leitner | | B60R 3/02 |
| 2017/0298675 A1* | 10/2017 | Dimig | | B60R 3/02 |
| 2021/0031696 A1* | 2/2021 | Kaddouh | | B62D 33/02 |
| 2021/0261060 A1* | 8/2021 | Schwarz | | B60D 1/52 |
| 2022/0001728 A1* | 1/2022 | Nania | | B62D 33/0273 |
| 2022/0111796 A1* | 4/2022 | Klein | | B60D 1/58 |
| 2022/0161869 A1* | 5/2022 | Nania | | B62D 33/0273 |
| 2022/0161870 A1* | 5/2022 | Horner | | B60R 3/02 |
| 2022/0314888 A1* | 10/2022 | Glickman | | B60D 1/01 |
| 2022/0314889 A1* | 10/2022 | Glickman | | G01L 1/225 |
| 2023/0008195 A1* | 1/2023 | Salter | | B62D 33/037 |
| 2023/0022042 A1* | 1/2023 | Watson | | B60Q 1/30 |
| 2023/0139499 A1* | 5/2023 | Wells | | B62D 33/0273 296/183.1 |

* cited by examiner

DEPLOYABLE STEP SYSTEMS FOR ACCESSING CARGO SPACES ON VEHICLES EQUIPPED WITH A TAILGATE ASSEMBLY THAT INCLUDES A DOOR SUBASSEMBLY

TECHNICAL FIELD

This disclosure relates to motor vehicles, and more particularly to deployable step systems for accessing vehicle cargo spaces on vehicles equipped with a tailgate assembly having a door subassembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A vehicle according to an exemplary aspect of the present disclosure includes, among other things, a hitch tube, a bumper at least partially supported by the hitch tube, and a deployable step system mounted to the hitch tube and movable between a stowed position and a deployed position relative to the bumper. In the stowed position, a step pad of the deployable step system establishes a portion of the bumper. In the deployed position, the step pad is rearward and vertically lower than the bumper.

In a further non-limiting embodiment of the foregoing vehicle, the hitch tube extends in cross-width direction of the vehicle and is a component of a vehicle body of the vehicle. A trailer hitch is mounted to the hitch tube.

In a further non-limiting embodiment of either of the foregoing vehicles, a cross tube of the deployable step system is mounted directly to the hitch tube.

In a further non-limiting embodiment of any of the foregoing vehicles, the deployable step system includes an extension tube movably received within a passageway established by the cross tube.

In a further non-limiting embodiment of any of the foregoing vehicles, the deployable step system includes a deployment tube pivotably connected to the extension tube.

In a further non-limiting embodiment of any of the foregoing vehicles, an extension of the extension tube outside of the passageway positions the step pad rearward of the bumper. A pivoting of the deployment tube relative to the extension tube positions the step pad vertically lower than the bumper.

In a further non-limiting embodiment of any of the foregoing vehicles, a control module is programmed to command the deployable step system to move from the stowed position to the deployed position when a door subassembly of a tailgate assembly is moved from a door closed position to a door open position.

In a further non-limiting embodiment of any of the foregoing vehicles, the control module is further programmed to command that a height of the vehicle be lowered when the deployable step system is moved to the deployed position.

In a further non-limiting embodiment of any of the foregoing vehicles, the control module is configured to command an air suspension of the vehicle to release air to lower the height of the vehicle.

In a further non-limiting embodiment of any of the foregoing vehicles, the door subassembly is configured to pivot between the door closed position and the door open position.

In a further non-limiting embodiment of any of the foregoing vehicles, the deployable step system is movable from the stowed position to a first partially deployed position, and then from the first partially deployed system to a second partially deployed position, and then from the second partially deployed position to the deployed position.

In a further non-limiting embodiment of any of the foregoing vehicles, the deployable step system is mounted at a location that is outboard of a bumper step of the bumper.

In a further non-limiting embodiment of any of the foregoing vehicles, the deployable step system includes an activation button configured to release the deployable step system for movement from the stowed position to the deployed position.

In a further non-limiting embodiment of any of the foregoing vehicles, the vehicle is a pickup truck that includes a cargo bed.

In a further non-limiting embodiment of any of the foregoing vehicles, the step pad includes an inner surface that is concealed in the stowed position and that establishes a step surface in the deployed position.

A method according to another exemplary aspect of the present disclosure includes, among other things, moving a deployable step system of a vehicle between a stowed position and a deployed position. In the stowed position, a step pad of the deployable step system establishes a portion of a bumper of the vehicle. In the deployed position, the step pad is rearward and vertically lower than the bumper.

In a further non-limiting embodiment of the foregoing method, moving the deployable step system includes moving the deployable step system from the stowed position to a first partially deployed position.

In a further non-limiting embodiment of either of the foregoing methods, moving the deployable step system from the stowed position to the first partially deployed position includes moving an extension tube in a rearward direction relative to a cross tube of the deployable step system to position the step pad rearward of the bumper.

In a further non-limiting embodiment of any of the foregoing methods, moving the deployable step system includes moving the deployable step system from the first partially deployed position to a second partially deployed position, and moving the deployable step system from the second partially deployed position to the deployed position.

In a further non-limiting embodiment of any of the foregoing methods, moving the deployable step system from the second partially deployed position to the deployed position includes pivoting a deployment tube of the deployable step system relative to the extension tube to position the step pad vertically lower than the bumper.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
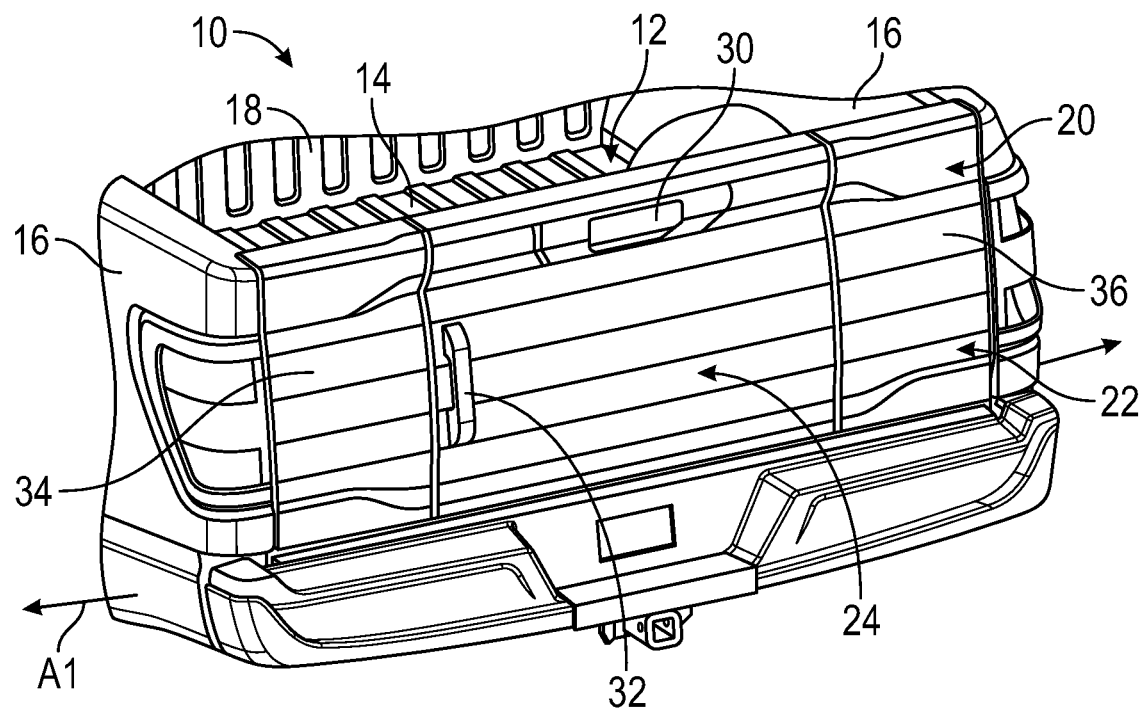
FIG. 1 is a rear perspective view of a motor vehicle equipped with a cargo space and a tailgate assembly positioned in a tailgate closed position relative to the cargo space.

This disclosure details deployable step systems for accessing vehicle cargo spaces on vehicles equipped with a tailgate assembly having a door subassembly. An exemplary deployable step system may include a bumper integrated step pad that is movable between a stowed position and a deployed position. In the stowed position, the step pad establishes a portion of the bumper, and in the deployed position, the step pad is rearward and vertically lowered relative to the bumper. These and other features of this disclosure are described in greater detail below.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 may include, among other things, a frame subassembly 22 and a door subassembly 24. The door subassembly 24 may sometimes be referred to as a "swing gate subassembly." The frame subassembly 22 may include a driver side section 34, a passenger side section 36, and a connection member 38 (see FIG. 3) connected between the driver side section 34 and the passenger side section 36. The door subassembly 24 may be connected to either the driver side section 34 or the passenger side section 36 by a hinge assembly 35 (see FIG. 3).

Figure 2:
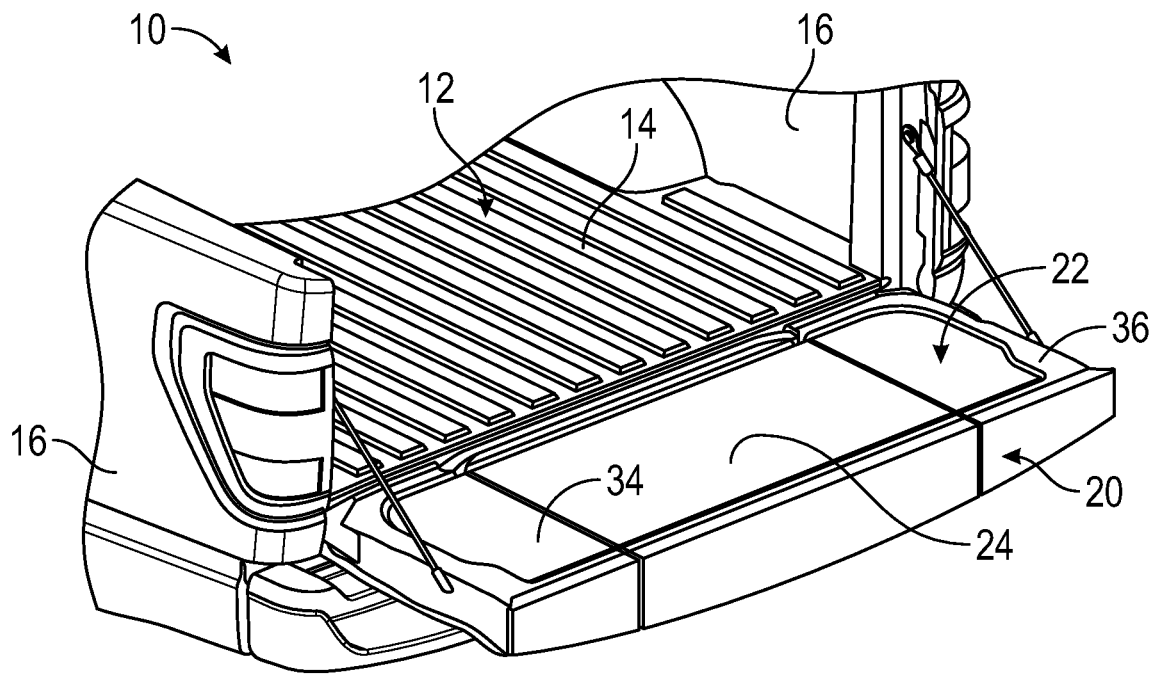
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

The door subassembly 24 of the tailgate assembly 20 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
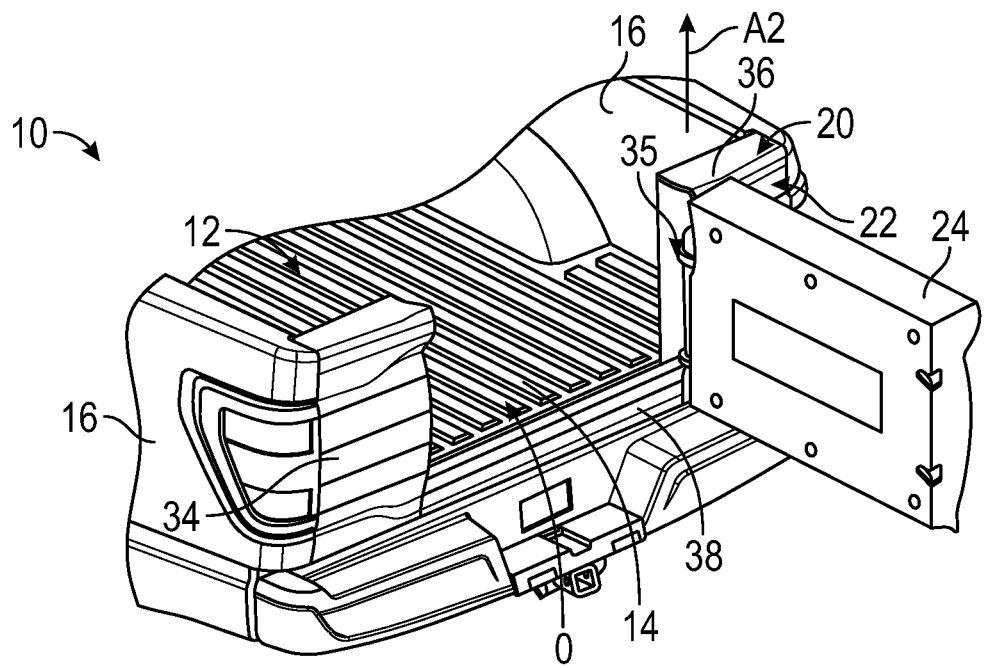
FIG. 3 illustrates a door subassembly of the tailgate assembly of FIG. 1 in a door open position.

When in the tailgate closed position, the door subassembly 24 is pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is a vertically extending axis. The door subassembly 24 may be moved between the door closed position and the door open position by grasping a second handle 32 (see FIG. 1) of the tailgate assembly 20, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 in positioned in the door open position. Placing the door subassembly 24 in the door open position allows the user 26 to move closer to the cargo bed 12 than, for example, when the tailgate assembly 20 is positioned in the tailgate open position of FIG. 2.

Figure 4:
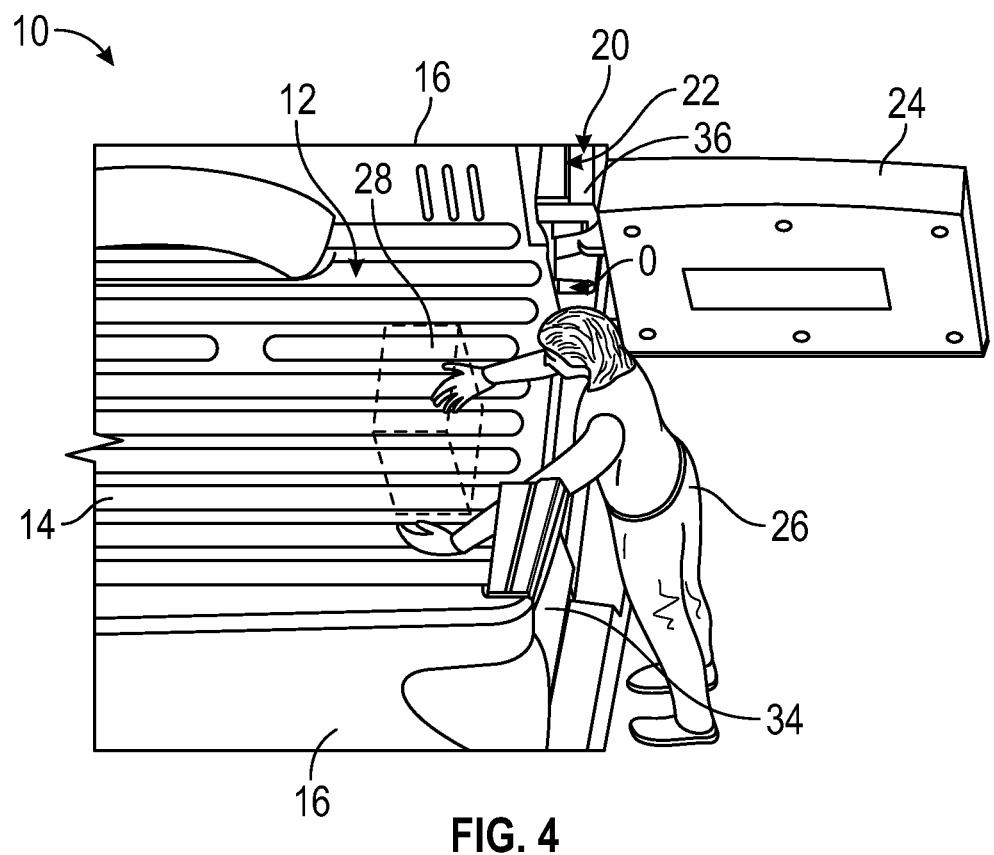
FIG. 4 is a rear and top view of the tailgate assembly and the door subassembly of FIG. 3.

The cargo bed access opening O can also provide clearance for the user 26 to enter the cargo bed 12 to either load or retrieve an item of cargo 28 (see FIG. 4). The user 26 may require assistance for stepping up and accessing the cargo bed 12 from the ground. This disclosure is therefore directed to systems for enabling improved access to the cargo bed 12.

Figure 5:
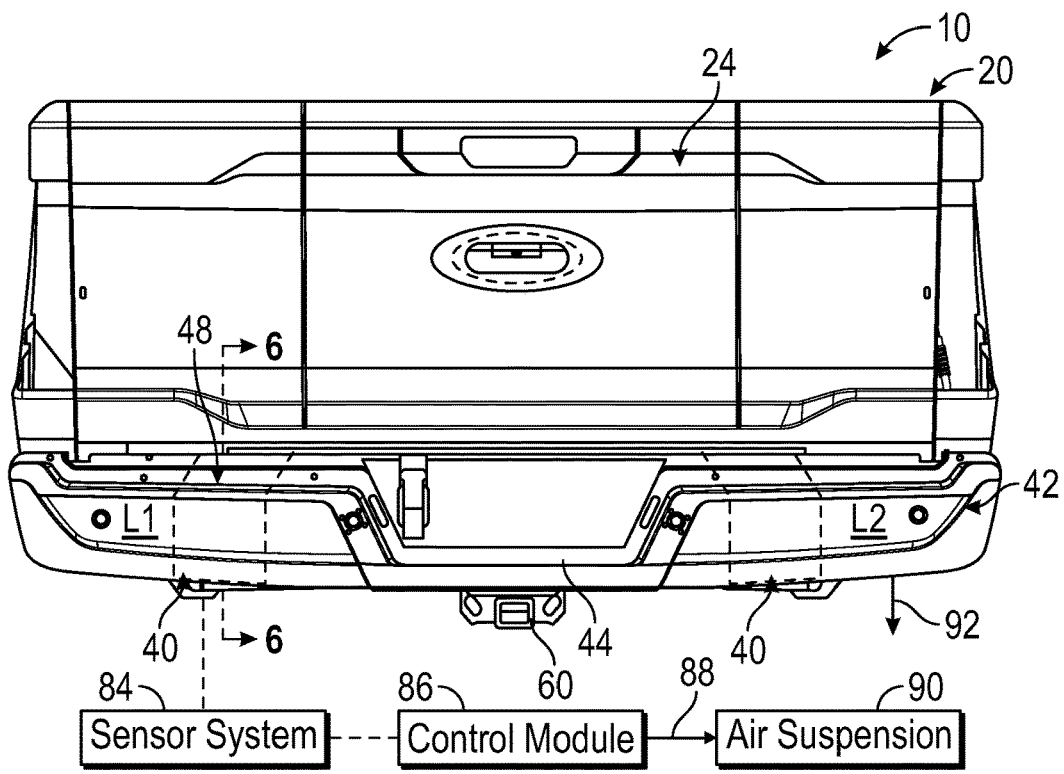
FIG. 5 illustrates a deployable step system for accessing a vehicle cargo space.
Figure 6:
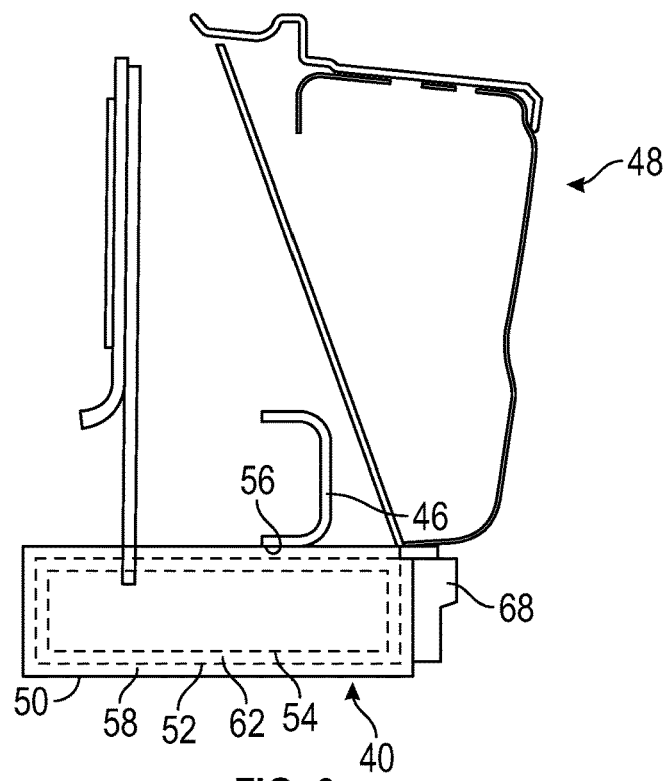
FIG. 6 is a cross-sectional view of the deployable step system of FIG. 5.

FIGS. 5 and 6 illustrate a deployable step system 40 that can be utilized in connection with the tailgate assembly 20 of FIGS. 1-4. The deployable step system 40 is configured for assisting the user in accessing the cargo bed 12 when the door subassembly 24 is moved to the door open position shown in FIGS. 3 and 4.

The deployable step system 40 may provide a fold-out step design that is integrated into a bumper 42 of the vehicle 10. In an embodiment, the deployable step system 40 is mounted at a location L1 that is outboard of a bumper step 44 of the bumper 42 on the driver side of the vehicle 10. In another embodiment, the deployable step system 40 is mounted at a location L2 that is on the opposite side of the bumper step 44 from the location L1 (i.e., on the passenger side of the vehicle 10). In yet another embodiment, two deployable step systems 40 could be provided, with one deployable step system 40 provided at both the location L1 and the location L2.

The deployable step system 40 may be mounted to a hitch tube 46 of the vehicle 10. The hitch tube 46 is an integral component of a vehicle body structure of the vehicle 10 and supports the bumper 42. The hitch tube 46 extends in cross-width direction of the vehicle 10, and in an embodiment, extends across a majority of the width of the bumper 42.

The hitch tube 46 may support a trailer hitch 60 of the vehicle 10. The trailer hitch 60 may provide a receiver tube adapted to receive another trailer component (e.g., a ball mount) for connecting a trailer to the vehicle 10. As schematically depicted by the locations L1, L2, the deployable step system 40 may be mounted to the hitch tube 46 at a location that is outboard of the trailer hitch 60.

The deployable step system 40 may include a step pad 48, a cross tube 50, an extension tube 52, and a deployment tube 54. The cross tube 50 may be mounted directly to the hitch tube 46. In an embodiment, the cross tube 50 is bolted or welded to a bottom surface 56 of the hitch tube 46. In another embodiment, the cross tube 50 is mounted at an angle relative to the hitch tube 46 to allow the step pad 48 to be positioned further outboard toward the corner of the bumper 42 when deployed.

The cross tube 50 includes a passageway 58 that is sized and shaped to receive the extension tube 52 and the deployment tube 54. The deployment tube 54 may be received within a passageway 62 of the extension tube 52 and is movable thereto in a telescoping fashion. Of course, an opposite configuration is also contemplated in which the deployment tube 54 is received over and movable relative to an outer diameter surface of the extension tube 52. As further discussed below, the extension tube 52 may be moved to a position outside of the cross tube 50, and the deployment tube 54 may then be manipulated relative to the extension tube 52 to deploy the step pad 48 to a position that is rearward and vertically lower compared to the bumper 42.

The deployable step system 40 may additionally include an activation button 64 for deploying the extension tube 52 from the cross tube 50. The activation button 64 may be slightly recessed relative to an exterior surface of the bumper 42 to protect the activation button 64 from ricocheting objects (e.g., rocks, stones, debris, etc.). The activation button 64 may be moved in a direction toward the cross tube 50 to release a latch (not shown) that holds the step pad 48 in the stowed position.

Figure 7:
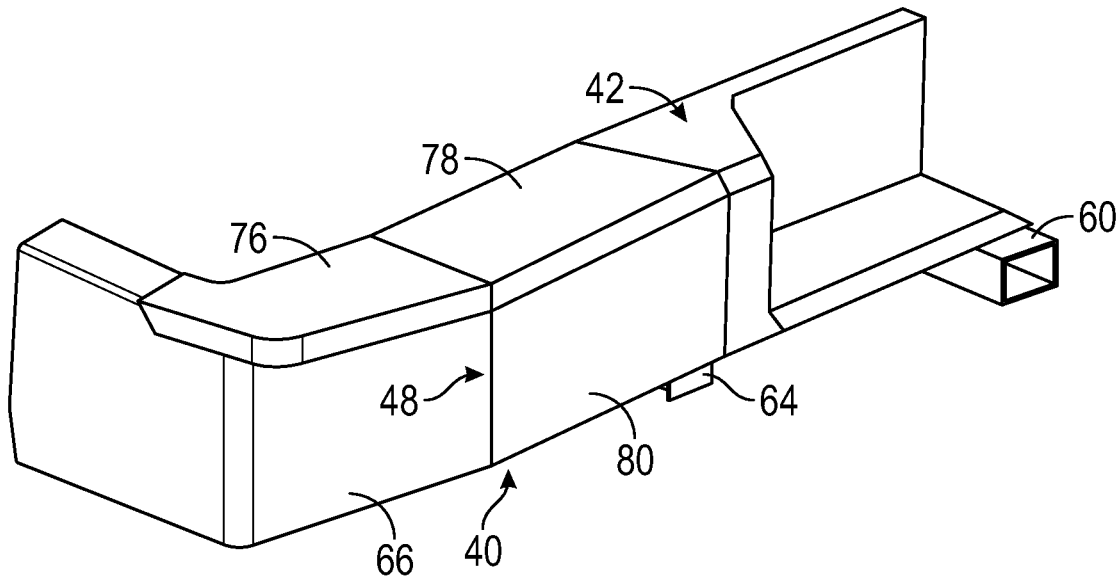
FIG. 7 illustrates a stowed position of a deployable step system.
Figure 10:
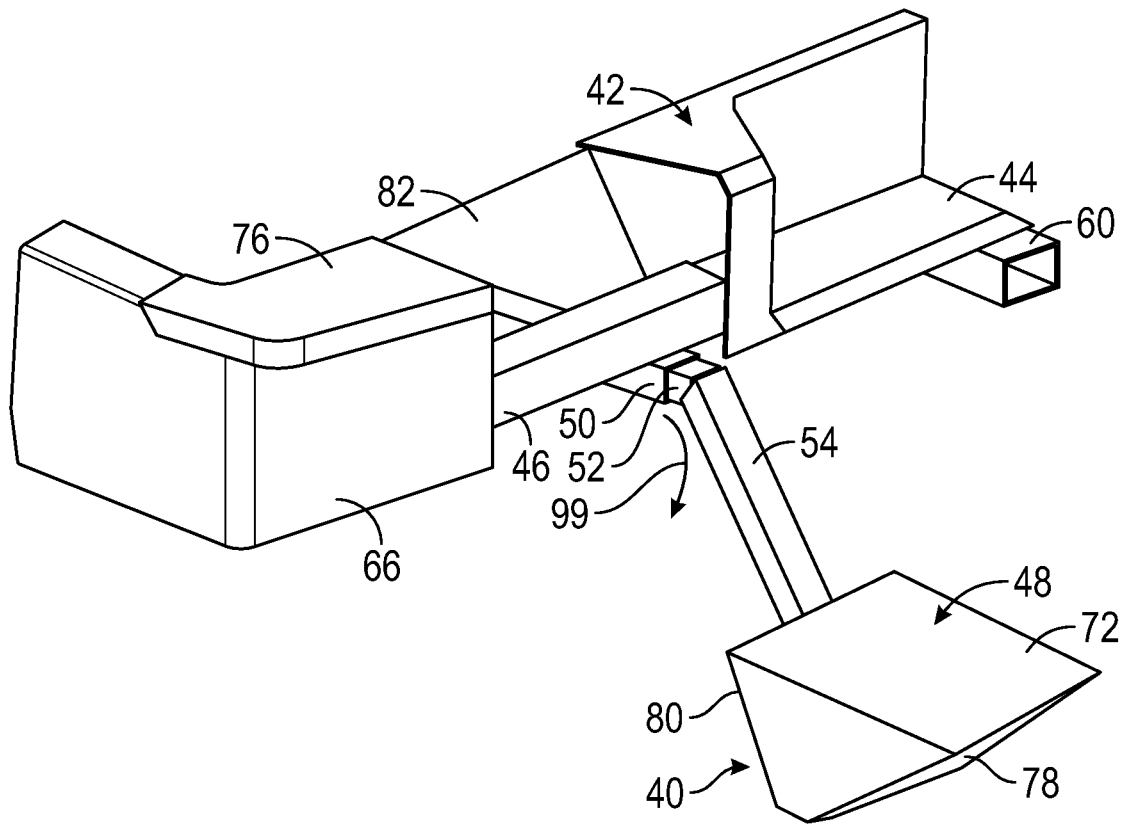
FIG. 10 illustrates a deployed position of the deployable step system of FIG. 7.

The deployable step system 40 is movable between a stowed position shown in FIG. 7 and a deployed position shown in FIG. 10. The components of the deployable step system 40 may be manually or automatically moved, such as via a motor and a drive tube, cable, or screw, for example, between the stowed and deployed positions.

In the stowed position, an upper outer surface 78 of the step pad 48 establishes a portion of a top surface 76 of the bumper 42, and a rear outer surface 80 of the step pad 48 establishes a portion of a rear face 66 of the bumper 42. The upper outer surface 78 of the step pad 48 may be used as a step surface for stepping up and into the cargo bed 12 when the tailgate assembly 20 of the vehicle 10 is in the tailgate closed position of FIG. 1 or FIG. 3 and the deployable step system 40 is in the stowed position of FIG. 7.

Figure 8:
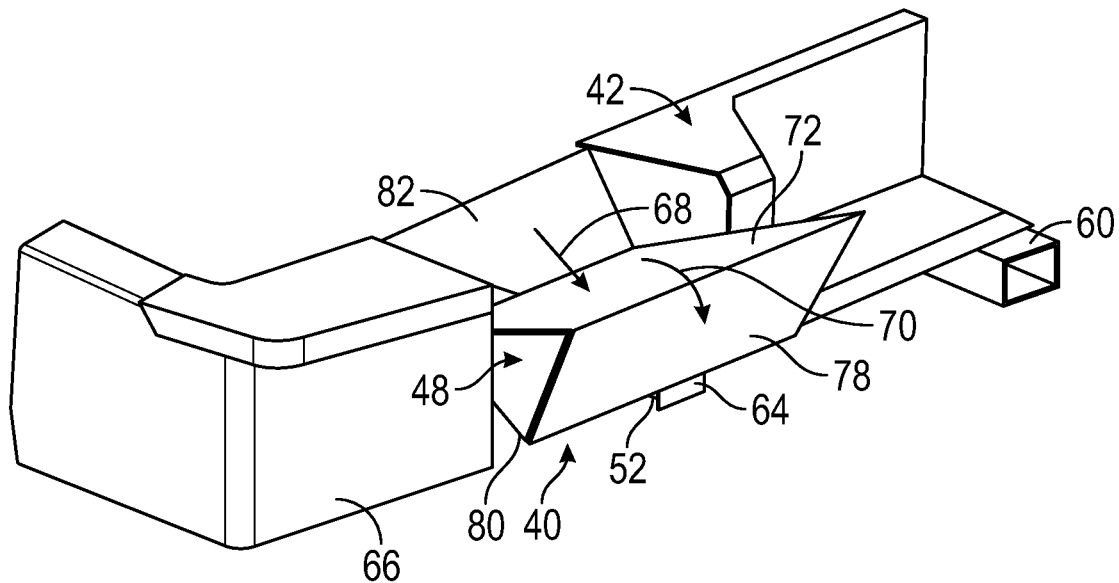
FIG. 8 illustrates a first partially deployed position of the deployable step system of FIG. 7.

When the activation button 64 is pushed, the extension tube 52 may begin to move relative to the cross tube 50, thereby moving the step pad 48 from the stowed position of FIG. 7 to a first partially deployed position shown in FIG. 8. In the first partially deployed position, the extension tube 52 is moved to a position that is about horizontal with the rear face 66 of the bumper 42, thereby moving the step pad 48 in a direction of arrow 68 to a position that is slightly rearward of the bumper 42. The step pad 48 may also begin to rotate outwardly in a direction of arrow 70. An inner surface 72 of the step pad 48 remains facing toward the vehicle 10 in the first partially deployed position.

A stone shield 82 may be exposed when the deployable step system 40 is moved to the first partially deployed position. In an embodiment, the stone shield 82 is scoop shaped. The stone shield 82 may be secured to the bumper 42 for reinforcing the bumper shell and is configured to hide the gap between the bumper 42 and the portions of the vehicle body to which the bumper 42 is secured.

Figure 9:
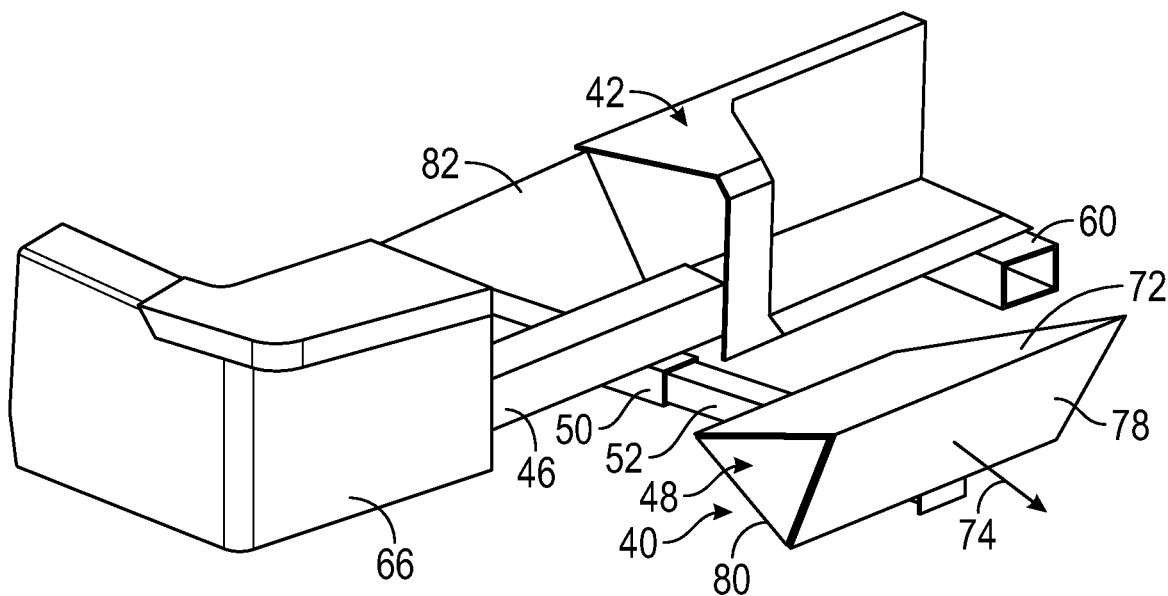
FIG. 9 illustrates a second partially deployed position of the deployable step system of FIG. 7.

From the first partially deployed position of FIG. 8, the deployable step system 40 may be further moved to a second partially deployed position shown in FIG. 9. In the second partially deployed position, the extension tube 52 is moved in a direction of arrow 74 to its extension limit relative to the cross tube 50 in order to position the step pad 48 fully rearward of the rear face 66 of the bumper 42. The inner surface 72 of the step pad 48 remains facing slightly toward the rear of the vehicle 10 in this position.

The deployable step system 40 may next be moved from the second partially deployed position of FIG. 9 to the fully deployed position of FIG. 10. In order to do so, the deployment tube 54 may be pivoted downwardly in a direction of arrow 99 relative to the extension tube 52 to position the step pad 48 vertically lower than the bumper step 44 of the bumper 42. In an embodiment, the deployment tube 54 is pivoted by about 45° relative to the extension tube 52, although other deployment angles of extent are also contemplated herein. In the fully deployed position, the inner surface 72 of the step pad 48 is moved to a position that is about parallel to a top surface 76 of the bumper 42 and provides a secondary step surface for allowing the user to step up and into the cargo bed 12.

The deployment tube 54 may be mechanically secured to the extension tube 52 for achieving the pivotable connection therebetween. A mechanical connector, such as a pin, for example, may be employed for achieving the pivotable connection.

In an embodiment, the step pad 48 is triangular shaped. The inner surface 72 of the step pad 48 may be the hypotenuse of the triangular step pad 48 and is thus the longest side of the step pad 48 (i.e., the inner surface 72 is larger than both the upper outer surface 78 and the rear outer surface 80 of the step pad 48). Therefore, when moved to the deployed position, the inner surface 72 provides a step surface having a larger surface area than that provided by the upper outer surface 78 when the step pad 48 is in the stowed position.

Referring again primarily of FIG. 5, the deployable step system 40 may additionally include a sensor system 84 and a control module 86 that are operably connected to one another. The sensor system 84 may include a multitude of sensors (e.g., ultrasonic sensors, radar sensors, or both) arranged and configured for monitoring the environment to the rear of the vehicle 10. For example, the sensor system 84 may monitor the environment to the rear of the vehicle 10 for detecting obstructions in a door opening path of the door subassembly 24 of the tailgate assembly 20 and/or an opening path of the deployable step system 40.

Although schematically illustrated as a single controller, the control module 86 may be part of a vehicle control system that includes a plurality of additional control modules for interfacing with and commanding operation of the various components of the vehicle 10. In an embodiment, the control module 86 is part of a body control module (BCM) of the vehicle 10. However, other configurations are also contemplated.

In an embodiment, the control module 86 is programmed to automatically command deployment of the deployable step system 40 when the door subassembly 24 of the tailgate assembly 20 is moved to the door open position. In another embodiment, the control module 86 is configured to automatically stop deployment of the deployable step system 40 and return the deployable step system 40 to the stowed position when the sensor system 84 detects an obstruction in the opening path of the deployable step system 40.

In yet another embodiment, the control module 86 is programmed to automatically command that the height of the vehicle 10 be lowered when the deployable step system 40 is moved to the deployed position. For example, in response to deploying the deployable step system 40, the control module 86 may communicate a command signal 88 to an air suspension 90 of the vehicle 10 for "kneeling" the rear end of the vehicle 10. The command signal 88 instructs the air suspension 90 to release air (e.g., from a suspension member such as a shock), thereby lowing the rear end of the vehicle 10 in a direction of arrow 92 (i.e., toward the ground).

In the lowered or "kneeled" position of the vehicle 10, the step pad 48 of the deployable step system 40 is positioned vertically lower relative to the ground. The user, particularly a user having a relatively small stature, can place their foot on the inner surface 72 of the step pad 48 in this position to more easily step up and into the cargo bed 12.

The deployable step systems of this disclosure provide solutions for improving access to vehicle cargo spaces. The exemplary deployable step systems provide less complex and more cost effective stepping solutions for accessing and utilizing the cargo spaces.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a hitch tube;
a bumper at least partially supported by the hitch tube; and
a deployable step system mounted to the hitch tube and movable between a stowed position and a deployed position relative to the bumper,
wherein, in the stowed position, a step pad of the deployable step system establishes a top surface of the bumper,
wherein, in the deployed position, the step pad is rearward and vertically lower than the bumper,
wherein the step pad includes an upper outer surface that establishes the top surface in the stowed position, and further wherein the top surface is an upper step surface of the bumper.

2. The vehicle as recited in claim 1, wherein the hitch tube extends in cross-width direction of the vehicle and is a component of a vehicle body of the vehicle, and further comprising a trailer hitch mounted to the hitch tube.

3. The vehicle as recited in claim 1, wherein a cross tube of the deployable step system is mounted directly to the hitch tube, wherein the deployable step system includes an extension tube movably received within a passageway established by the cross tube.

4. The vehicle as recited in claim 3, wherein the deployable step system includes a deployment tube pivotably connected to the extension tube.

5. The vehicle as recited in claim 4, wherein an extension of the extension tube outside of the passageway positions the step pad rearward of the bumper, and further wherein a pivoting of the deployment tube relative to the extension tube positions the step pad vertically lower than the bumper.

6. The vehicle as recited in claim 1, comprising a control module programmed to command the deployable step system to move from the stowed position to the deployed position when a door subassembly of a tailgate assembly is moved from a door closed position to a door open position.

7. The vehicle as recited in claim 6, wherein the control module is further programmed to command that a height of the vehicle be lowered when the deployable step system is moved to the deployed position.

8. The vehicle as recited in claim 7, wherein the control module is configured to command an air suspension of the vehicle to release air to lower the height of the vehicle.

9. The vehicle as recited in claim 6, wherein the door subassembly is configured to pivot between the door closed position and the door open position.

10. The vehicle as recited in claim 1, wherein the deployable step system is movable from the stowed position to a first partially deployed position, and then from the first partially deployed position to a second partially deployed position, and then from the second partially deployed position to the deployed position.

11. The vehicle as recited in claim 1, wherein the deployable step system is mounted at a location that is outboard of a bumper step of the bumper.

12. The vehicle as recited in claim 1, wherein the deployable step system includes an activation button configured to release the deployable step system for movement from the stowed position to the deployed position.

13. The vehicle as recited in claim 1, wherein the step pad includes an inner surface that is concealed in the stowed position and that establishes a step surface in the deployed position.

14. A method, comprising:
moving a deployable step system of a vehicle between a stowed position and a deployed position,
wherein, in the stowed position, a step pad of the deployable step system establishes a top surface of a bumper of the vehicle, wherein, in the deployed position, the step pad is rearward and vertically lower than the bumper, wherein moving the deployable step system includes:

moving the deployable step system from the stowed position to a first partially deployed position, wherein moving the deployable step system from the stowed position to the first partially deployed position includes:

moving an extension tube in a rearward direction relative to a cross tube of the deployable step system to position the step pad rearward of the bumper.

15. The method as recited in claim 14, wherein moving the deployable step system includes:

moving the deployable step system from the first partially deployed position to a second partially deployed position; and moving the deployable step system from the second partially deployed position to the deployed position.

16. The method as recited in claim 15, wherein moving the deployable step system from the second partially deployed position to the deployed position includes:

pivoting a deployment tube of the deployable step system relative to the extension tube to position the step pad vertically lower than the bumper.

17. A vehicle, comprising:

a hitch tube;

a bumper at least partially supported by the hitch tube; and a deployable step system mounted to the hitch tube and movable between a stowed position and a deployed position relative to the bumper, wherein, in the stowed position, a step pad of the deployable step system establishes a portion of the bumper, wherein, in the deployed position, the step pad is rearward and vertically lower than the bumper, wherein the deployable step system includes a cross tube mounted directly to the hitch tube, an extension tube movably received within a passageway established by the cross tube, and a deployment tube pivotably connected to the extension tube.

* * * * *